Jan. 26, 1932. S. P. BURKE 1,843,063
PRODUCTION OF CARBON MONOXIDE AND HYDROGEN MIXTURES
Filed May 13, 1926
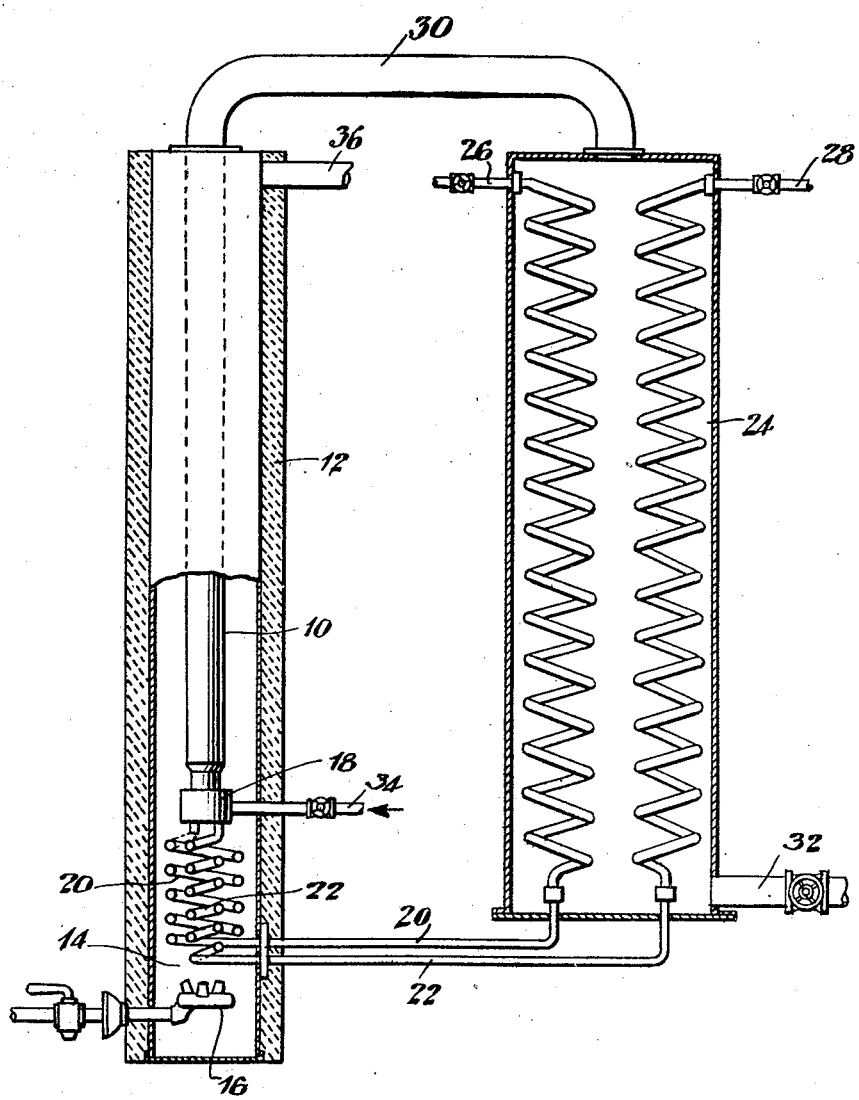
INVENTOR
STEPHEN P. BURKE
BY
ATTORNEY Patented Jan. 26, 1932

1,843,063

UNITED STATES PATENT OFFICE

STEPHEN P. BURKE, OF NEW YORK, N. Y., ASSIGNOR TO COMBUSTION UTILITIES CORPORATION, OF NEW YORK, N. Y., A CORPORATION OF MAINE

PRODUCTION OF CARBON MONOXIDE AND HYDROGEN MIXTURES

Application filed May 13, 1926. Serial No. 108,968.

This invention relates to an improved process for producing carbon-monoxide and hydrogen from hydrocarbons. The invention has for its object to provide a process which will enable the relative ratios of the reaction products to be readily controlled within fairly wide limits. The preferred hydrocarbon is natural gas although any readily volatilized liquid hydrocarbons may be employed.

I have found that the composition of the gas mixture which is obtained as the result of the combustion of hydrocarbons and air or oxygen is determined not only by the composition of the original mixture but also by the temperature attained by the gases during reaction. For example, a given combustible ratio of methane and air if caused to burn will furnish a gas mixture (products of combustion) of a definite composition. However, if the temperature of the combustion chamber is controlled so as to maintain it at some temperature different from that produced by the combustion of the mixture, the composition of the gaseous products obtained will differ from that which is obtained in the absence of such temperature control.

When methane is burned with oxygen insufficient in quantity to permit of complete combustion, the products are carbon-monoxide, carbon-dioxide, hydrogen and water and under certain conditions, carbon black and unchanged methane. If air is used as a source of oxygen the reaction products will, of course, also contain nitrogen. As the ratio of air or oxygen to methane is decreased below that required for complete combustion, increasing amounts of carbon-monoxide and hydrogen relative to the other products of reaction are obtained.

Theoretically, no methane or carbon should be obtained in the reaction products unless the ratio of air to methane by volume is less than $2\frac{1}{2}:1$ or in the case of oxygen less than $\frac{1}{2}:1$. Below this limiting ratio unchanged methane is obtained and in addition some carbon black is formed from the thermal decomposition of the methane.

In order that the invention may be more fully understood, the following example may be taken as illustrative of the procedure to be followed when the end products desired are carbon-monoxide and hydrogen in substantially the ratio of $1:2$.

If we start with air and methane in the ratio of $2\frac{1}{2}:1$ and maintain the temperature of the reaction chamber at approximately 1000° C. the final composition of the issuing gases will be almost quantitatively carbon-monoxide and hydrogen in the ratio of $1:2$. Carbon-dioxide and water may be present in traces—possibly 1%. In order to prevent a reversal of the reactions which have occurred in the reaction chamber the reaction products should be cooled as rapidly as possible on leaving the reaction chamber, preferably to a temperature of about 500° C. Since the heat evolved in the reaction when using the mixture specified above is not sufficient to maintain the desired temperature of 1000° C., additional heat must be supplied to the chamber from an external source. In order to reduce the amount of heat which must be supplied to the reaction chamber itself, it is preferred to preheat the gases to be reacted to a suitable temperature—say a temperature of 600° C. or above,—this preheating being preferably effected by utilizing the heat abstracted from the gases issuing from the reaction chamber. When the gases in the example given above are preheated to a temperature of about 800° C. the equilibrium temperature in the reaction chamber will be automatically maintained at approximately 1000° C. It is preferred that the air and methane be preheated separately and thereafter discharged into the reaction chamber in such a way that intimate mixing is quickly accomplished. By heating the gases separately any objectionable preliminary reactions are prevented.

In the foregoing example a temperature of approximately 1000° C. in the reaction chamber will enable carbon-monoxide and hydrogen to be obtained in the ratio of approximately $1:2$. If the same mixture of methane and air is used but the temperature of the reaction chamber is lower than 1000° C., carbon dioxide and water will be formed in greater proportions and the ratio of carbon-monoxide to hydrogen will also be changed. In particular if the temperature of the reaction chamber is maintained at about 700° C. the carbon monoxide-hydrogen ratio will be approximately 1:3. The desirability of being able to control the carbon monoxide-hydrogen ratio is of special importance in the synthesis of certain products; for example, in the synthesis of methanol it is desirable that the carbon monoxide-hydrogen ratio be maintained as nearly as possible in the ratio of 1:2.

The source of methane for use in the present process is preferably natural gas. However, it is within the scope of this invention to employ hydrocarbons other than methane. In such cases the ratio of carbon to hydrogen in the available hydrocarbons may make it impossible to obtain the desired carbon monoxide-hydrogen ratio unless additional hydrogen is supplied. This may be accomplished by the introduction of steam to the reaction chamber. For example, if propane is employed in place of methane, the addition of two volumes of steam to a propane-air mixture in the ratio of 1:2½ will produce a carbon monoxide-hydrogen mixture in the ratio of 1:2 provided the temperature of the reaction chamber is maintained above 1000° C.

It is preferred that the reaction chamber be filled with a heat resistant contact body which should preferably contain iron or nickel or their oxides. As previously indicated the gaseous products of the reaction should be cooled very rapidly on leaving the reaction chamber to prevent the reversal of the reactions which have occurred. After the gases have been cooled they may be scrubbed with an alkali to remove any carbon-dioxide that may be present if such removal is desired.

As previously indicated the free oxygen content in the reacting mixtures is insufficient to propagate a flame through the mixture. In other words, the reacting mixtures will not "burn" or support combustion as this term is commonly understood.

The accompanying drawing shows in somewhat diagrammatic form, apparatus adapted for the practice of the present invention.

In the drawing, numeral 10 designates a reaction tube of quartz or other suitable heat-resistant material surrounded by a heat-insulated casing or jacket 12 adapted to serve as a flue for the products of combustion formed in the combustion chamber 14 by the combustion of a suitable fuel at the burner 16. Flue gases formed by combustion within the chamber 14 are conducted away through an outlet 36 in the jacket 12 adjacent the opposite end of the reaction tube 10.

One end of the reaction tube 10 is connected with a mixing valve 18, the latter also being connected to the respective coils in an air conduit 20 and in a conduit 22 for hydrocarbon or other suitable combustible gas.

The respective conduits 20 and 22 extend into and through a heat exchanger and cooler 24, and from thence they lead respectively to sources of supply of air and of combustible gas, through the valved conduits 26 and 28.

The end of the reaction tube opposite that connected with the valve 18, is in communication through a short vapor and gas conduit 30 with the end of heat exchanger 24 with which the respective conduits 26 and 28 communicate, for facilitating rapid cooling of the gases and vapors formed in the reaction tube.

The end of the heat exchanger 24 opposite the conduit 30 is in valve-controlled communication through a conduit 32 with separating and scrubbing apparatus (not shown), for the purpose of removing condensible vapors and impurities from the permanent gases. A valve-controlled steam conduit 34 connects the mixing valve 18 with a source of steam under pressure, and it permits the addition of suitable quantities of steam to the air-combustible gas mixture flowing to the reaction chamber 10. The flue gases, may, if desired, be piped through the heat exchanger 24 for the purpose of utilizing their heat for preheating therein the respective supplies of gas and air.

The invention may be summarized by stating that it relates primarily to the production of carbon-monoxide and hydrogen in controllable proportions by controlling the temperature of the reaction chamber. In any given case the temperature employed will be determined by the composition of the hydrocarbon mixture which is available and the composition of the end products desired. In general, it may be said that when a maximum yield of carbon-monoxide or hydrogen is sought regardless of the ratio of one to the other, temperatures in excess of 950° C. should be employed in the reaction chamber.

What I claim is:

1. The process for producing a mixture of carbon monoxide and hydrogen in controlled proportions, comprising, reacting a mixture of hydrocarbon and oxygen in which the former is present in proportions above the flame-propagating range of such a mixture of said hydrocarbon and oxygen at a selected and controlled temperature, maintaining said reaction temperature by supplying heat to the reaction zone from an external source, and rapidly removing and cooling the resultant reaction products as they are formed.

2. The process for producing substantially the maximum conversion of hydrocarbon to carbon monoxide from a hydrocarbon-air mixture wherein the oxygen content is insufficient to propagate a flame, comprising, preheating the mixture to a temperature upwards of 500° C., reacting the mixture under a selected and controlled temperature upwards of 950° C., and rapidly cooling the products of the reaction.

3. The process for producing carbon monoxide-hydrogen containing mixtures, comprising reacting a hydrocarbon-air mixture in which the oxygen content is insufficient to propagate a flame while maintaining the mixture at a preselected temperature by heat transferred thereto from an independent source of heat under conditions adapted to prevent dilution of the reaction mixture by external agencies, and rapidly cooling the resultant reaction products to a temperature adapted to prevent reversal of the reaction and destruction of the said products.

4. The process for producing carbon monoxide-hydrogen containing mixtures, comprising reacting a hydrocarbon air mixture in which the oxygen content is insufficient to propagate a flame while maintaining the mixture at a preselected temperature by heat transferred thereto from an independent source of heat under conditions adapted to prevent dilution of the reaction mixture by external agencies, and rapidly cooling the resultant reaction products to a temperature adapted to prevent reversal of the reaction and destruction of the said products, in part, at least, by heat exchange with a hydrocarbon and with air subsequently to be mixed and reacted in the process, thereby preheating each of the latter.

5. The process for producing carbon monoxide-hydrogen mixtures, comprising reacting a hydrocarbon-oxygen mixture in which the oxygen is present in amounts insufficient to propagate a flame while maintaining the mixture at a preselected temperature by heat transferred from an independent source of heat under conditions to prevent dilution of the reaction mixture by external agencies, and rapidly cooling the resultant reaction products to a temperature sufficiently low to substantially prevent the reversal of the reaction and destruction of the said products.

6. The process as defined in claim 3 in which the hydrocarbon and the air are separately preheated to a temperature of 600° C. or above, prior to being reacted.

7. The process for controlling the production of carbon monoxide-hydrogen containing mixtures in predetermined ratios, which comprises preheating to a temperature of at least 600° C., a hydrocarbon and air, mixing the same so as to produce a hydrocarbon-air mixture in which the oxygen content is insufficient to propagate a flame, reacting the hydrocarbon-air mixture while maintaining the same at a preselected temperature by heat transferred from an independent source of heat under conditions to prevent dilution of the reaction mixture by external agencies, and thereafter rapidly cooling the resultant reaction products to a temperature not higher than 500° C.

8. The process for producing carbon monoxide-hydrogen mixtures, which comprises reacting a mixture containing gaseous hydrocarbons and free oxygen, in which the oxygen content is insufficient to propagate a flame, while maintaining the mixture at a preselected temperature different from that which is capable of being produced by the reaction itself, while avoiding dilution of the resultant reaction products by external agencies, and rapidly cooling the said reaction products to a temperature at least low enough to prevent substantial reversal of the reaction and destruction of the said products.

9. The process for producing the maximum conversion of methane to carbon monoxide from a methane-air mixture, which comprises reacting such mixture in which methane and air are present in the ratio of 1:2½ under a controlled temperature of approximately 1000° C., and thereafter rapidly cooling the resultant gaseous products to a temperature adapted to prevent reversal of the reaction and destruction of the carbon-monoxide.

10. The process for producing the maximum conversion to carbon monoxide of the methane content of a methane-air mixture, which comprises preheating the methane and air to be reacted, thereafter mixing and reacting the same under a controlled temperature of approximately 1000° C., the proportion of air in the methane-air mixture being insufficient to maintain the reaction mixture at the said temperature alone by the heat of combustion of such mixture, and thereafter rapidly cooling the resultant gaseous product to a temperature adapted to substantially prevent the reversal of the reaction.

11. The process of producing gaseous mixtures containing carbon monoxide-hydrogen mixtures in controlled proportions, which comprises reacting a mixture of natural gas and air wherein the oxygen content is insufficient to propagate a flame, while supplying sufficient additional heat to the mixture to maintain the said temperature and while preventing dilution of the gaseous products of the said reaction, and thereafter rapidly cooling the said products to a temperature adapted to prevent substantial reversal of the reaction.

12. The process for producing gaseous mixtures containing carbon monoxide-hydrogen mixtures in controlled proportions which comprises reacting, in the presence of steam, a mixture of a hydrocarbon and air in which mixture the oxygen content is insufficient to propagate a flame, while maintaining the mixture at a preselected temperature by heat transferred thereto from an independent source of heat, and rapidly cooling the resultant reaction products to a temperature adapted substantially to prevent the reversal of the reaction.

13. The process as defined in claim 11 in which the mixture to be reacted contains a gaseous hydrocarbon and air, the said hydrocarbon containing more than one carbon atom in its nucleus.

14. The process as defined in claim 11 in which the gaseous mixture to be reacted comprises a gaseous hydrocarbon and free oxygen.

15. The process for producing carbon monoxide-hydrogen mixtures, which comprises preheating a hydrocarbon and air to a temperature of at least 600° C., reacting a mixture containing the preheated hydrocarbon and air in which the oxygen content is insufficient to propagate a flame, in the presence of steam, while maintaining the said mixture at a selected temperature by heat transferred thereto from an independent source of heat, and rapidly cooling the resultant reaction products to a temperature adapted substantially to prevent the reversal of the reaction and destruction of the said products.

In testimony whereof I affix my signature.

STEPHEN P. BURKE.